US007695362B1

(12) United States Patent
Kisenwether

(10) Patent No.: US 7,695,362 B1
(45) Date of Patent: Apr. 13, 2010

(54) METHOD, APPARATUS AND COMPUTER PROGRAM PRODUCT FOR ENHANCED BINGO GAME

(75) Inventor: Joseph P. Kisenwether, Sparks, NV (US)

(73) Assignee: GameTech International, Inc., Reno, NV (US)

( * ) Notice: Subject to any disclaimer, the term of this patent is extended or adjusted under 35 U.S.C. 154(b) by 160 days.

(21) Appl. No.: 11/190,694

(22) Filed: Jul. 26, 2005

(51) Int. Cl.
*A63F 13/00* (2006.01)

(52) U.S. Cl. ........................................................ 463/19

(58) Field of Classification Search ................... 463/19; 273/269
See application file for complete search history.

(56) References Cited

U.S. PATENT DOCUMENTS 5,624,119 A * 4/1997 Leake ......................... 273/269
6,186,892 B1 * 2/2001 Frank et al. ................... 463/19
6,581,935 B1 * 6/2003 Odom ........................ 273/269
2003/0144050 A1 * 7/2003 Keaton et al. ................. 463/19

* cited by examiner

*Primary Examiner*—John M Hotaling, II
*Assistant Examiner*—Jeffrey Wong
(74) *Attorney, Agent, or Firm*—Dillon & Yudell LLP

(57) ABSTRACT

A progressive, bingo-like game is disclosed. The game involves drawing a sequence of numbers and playing a conventional bingo-like game until a desired quantity of numbers to be drawn remains, and matching the remaining numbers to indicia in a manner that only yields a win upon the game's ending if the most recently drawn quantity of numbers all match numbered spaces bearing the indicia. The prize can be progressive prize, or a non-progressive prize, as desired by the game operator. Indicia can be colors, graphical symbols, or other visual designations that are viewable on a player's game card at the beginning of the game.

6 Claims, 3 Drawing Sheets

METHOD, APPARATUS AND COMPUTER PROGRAM PRODUCT FOR ENHANCED BINGO GAME

FIELD OF THE INVENTION

The present invention relates broadly to the bingo-like games. Specifically, the present invention relates to an enhancement to bingo-like games including an additional level of matching indicia to numbered spaces on a player card. More specifically, the present invention relates to an enhancement to bingo-like games where a quantity of most recently selected numbers are matched to a secondary set of indicia to win a prize separate from the prize awarded for winning the game.

BACKGROUND OF THE INVENTION

Bingo is a game that has been widely played for generations. Balls numbered from 1 to 75 are randomly selected and the number on the ball is read or called to the players. Players maintain one or more bingo cards, each having a matrix of rows and columns containing numbered spaces. Spaces on the bingo card are numbered 1 through 15 in the leftmost or "B" column, 16 through 30 in the next or "I" column, 31 through 45 in the center or "N" column, 46 through 60 in the "G" column, and 61 through 75 in the rightmost or "O" column. As the numbered balls are called, the player places a dauber or marker over the numbered space on the bingo card if the numbered space matches the number called. Players that place daubers in an acceptable pattern over matching numbers win a prize. For example, such patterns on the card can include a column, a row, a diagonal line, all four corners of the card, a cross, an intersection of lines, etc., or even every space on the bingo card. The caller or operator of the bingo game announces the winning pattern before the start of the game.

Bingo is becoming an increasingly popular form of gambling.

Players purchase cards, thus contributing to a cash prize paid to the winners. The cost of the card is often dictated by the statistical chance of winning, or the size of the prize. With the advent of electronic bingo, a player can simultaneously play a larger number of bingo cards. One electronic device generates random numbers between 1 and 75 and players use another device to monitor the called numbers and match them to electronic bingo cards. Progressive jackpots, prizes that increase as games are played to completion without a winner, also have attracted more players to the game of bingo.

Bingo still needs an added level of excitement and attraction to compete with traditional automated casino games such as slot machines or video poker machines. Bingo still suffers a shortcoming of infrequent wins in many instances of play. However, current variations on the game allow for progressive prizes to be won during play. But if a progressive prize is won for a particular bingo game, some of the excitement of a big jackpot is gone because the progressive prize gets reset to a low amount. In addition to significantly larger jackpots, bingo games need some added level of excitement of a prize that stands independent of a progressive prize being reset to a smaller amount.

SUMMARY OF THE INVENTION

The present invention addresses the problems discussed above and provides a method of playing an enhanced game of bingo. The method comprises drawing a sequence of numbers and playing a conventional game of bingo until a desired quantity of numbers to be drawn remains, and matching the remaining numbers to indicia in a manner that only yields a win upon the game's ending if the most recently drawn quantity of numbers all match numbered spaces bearing the indicia. The prize can be progressive prize, or a non-progressive prize, as desired by the game operator.

Indicia can be colors, graphical symbols, or other visual designations that are viewable on a bingo card at the beginning of the game. Multiple sets of symbols can be used and their selection combined through the method described herein to provide multiple ways to win the game and to provide prizes. The method of the present invention can be practiced in conventional games involving a human caller who draws numbered balls from a ball blower at a bingo desk, or may utilize a computer system to randomly generate and call numbers and coordinate play among players.

The bingo card can be in paper form or electronic form, and may be maintained and displayed on a card minding device or personal computer. Electronic embodiments of the method of the present invention can be played in a bingo hall that can be connected to other bingo halls to include additional players and combine prize amounts. Alternatively, in a computer network embodiment, multiple players can connect to a server computer that coordinates play and serves as a caller.

Progressive prize amounts and winning configurations of indicia can be displayed to players. Many other advantages and features of the present invention will be apparent from the following detailed description and drawings.

DETAILED DESCRIPTION

The enhanced game of bingo according to the present invention can be played in its most basic form such as a conventional, paper system, using physical indicators overlaid on a paper bingo card while a live caller draws numbered balls from a rotating cage. Bingo cards can also be displayed on a flashboard, video monitor display, hand held electronic display device, or other suitable apparatus.

Figure 1:
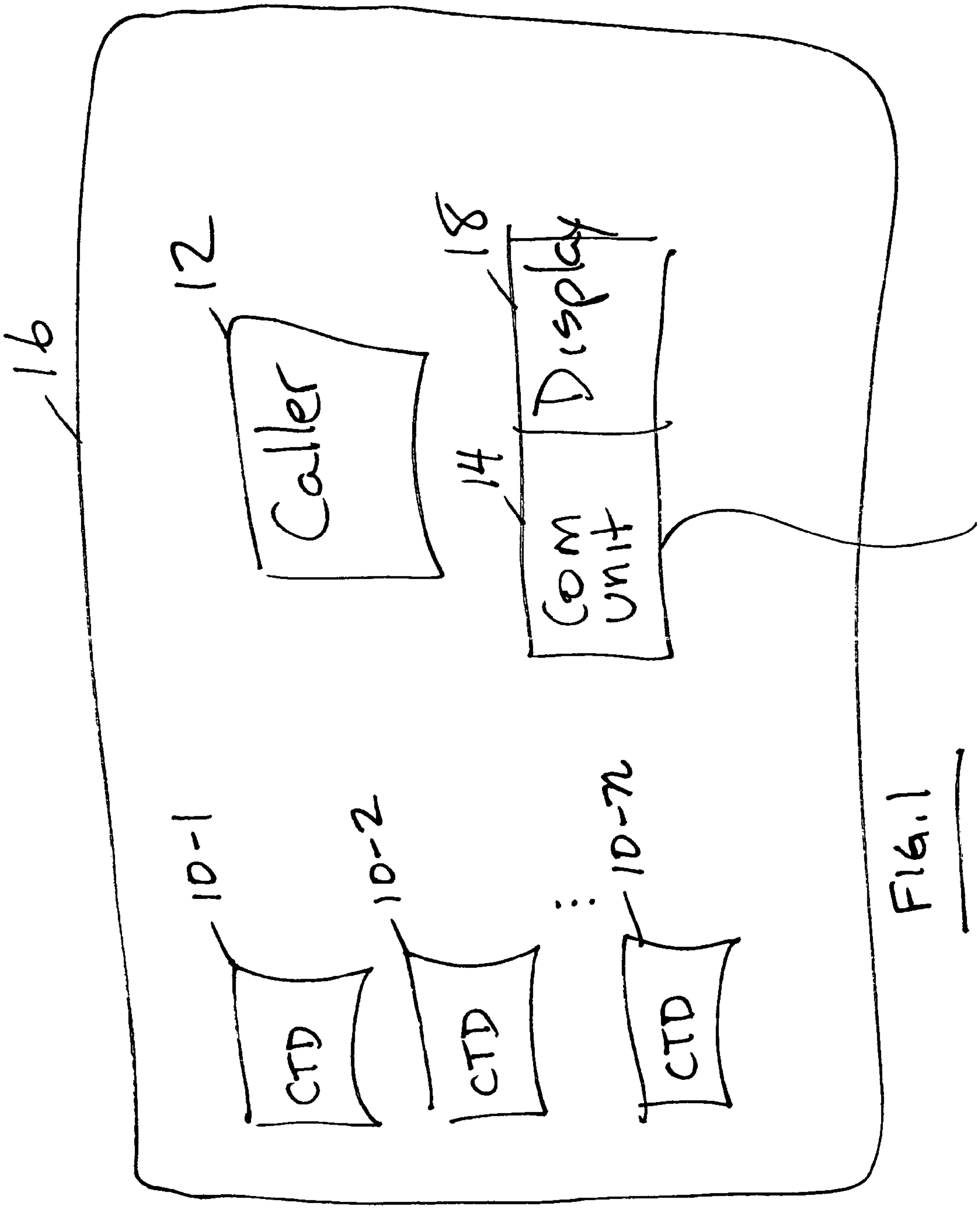
FIG. 1 illustrates in block diagram form the apparatus used when the present invention is implemented as an electronic system.

However, for the preferred embodiment, FIG. 1 illustrates in block diagram form the apparatus used when the present invention is implemented as an electronic system that allows players to play large numbers of cards simultaneously using an electronic card minding device, such as currently used in bingo parlors that have gaming licenses. In an electronic embodiment, players use card minding device 10-1, 10-2, through **10-*n*, where n represents the number of card minding devices available to players. Indicators are placed electronically by the card minding device 10 on electronic versions of bingo cards stored in its memory. Each electronic bingo card has a unique identification number that allows a bingo win to be verified by the caller 12. The card minding device 10 is in communication with the caller 12**. In an embodiment, caller

12 is a system that generates random numbers that are used in place of marked balls used in conventional bingo games. Random number generation in this embodiment is generally known by those skilled in the art and refers to a computer generating a value from a seed in a manner that is unpredictable either by a player or persons operating the bingo hall 16. The caller 12 also randomly selects indicators from a finite set of indicators, and sends both the called random numbers and selected indicators to the card minding devices 10. In an embodiment, number generation can be handled differently, such as by using a ball blower and hopper configuration such as used in conventional bingo games, with a person drawing the numbered balls and entering the values into caller 12. Communication unit 14 can also be in communication with caller 12, and can be used to link bingo hall 16 with other bingo halls to share games and prize amounts with additional players. Communication unit 14 links bingo hall 16 with other bingo halls by connecting to remote communication units over a telephone line or other suitable communication medium. Display 18 is also in communication with caller 12, and displays various information to players on a large display screen such as a video monitor in the preferred embodiment. In progressive games using the enhanced bingo game of the present invention, the prize amounts are updated based on win and payout data calculated by the caller 12.

The bingo cards used to play bingo in accordance with the present invention can utilize indicia for some of the spaces appearing on the card. In the preferred embodiment, different cards have different configurations of indicia. For example, by using indicia such as color, each space on the card can be individually assigned a color. Also, for example, on one card, the space in the upper left corner can be colored blue, while the space below it can be colored red. Different colors can be assigned more frequently than others, so that as numbers are selected during normal bingo play, the chances of placing a dauber on a green space are greater than placing a dauber on a blue space, and even greater than placing a dauber on a red space. A prize is awarded to a player if the player has daubers placed on cells bearing indicia that match the most-recently-selected numbers at the end of a game. The prize can be progressive or non-progressive, depending on the odds supporting the win as desired by the game operator. For example, the prize can be a progressive jackpot for all of the selected numbers appearing on spaces having the least frequent color, or the numbers appear on cells having a combination of colors, such as two blues, a red and a green, etc. However, in an embodiment, cards bearing only one type of homogenous indicia, for example colors, numbers, letters, a specific shape or collections of shapes and the like, of which a sufficient quantity of most-recently-called instances of the one type of indicia, are considered winning cards.

Figure 2:
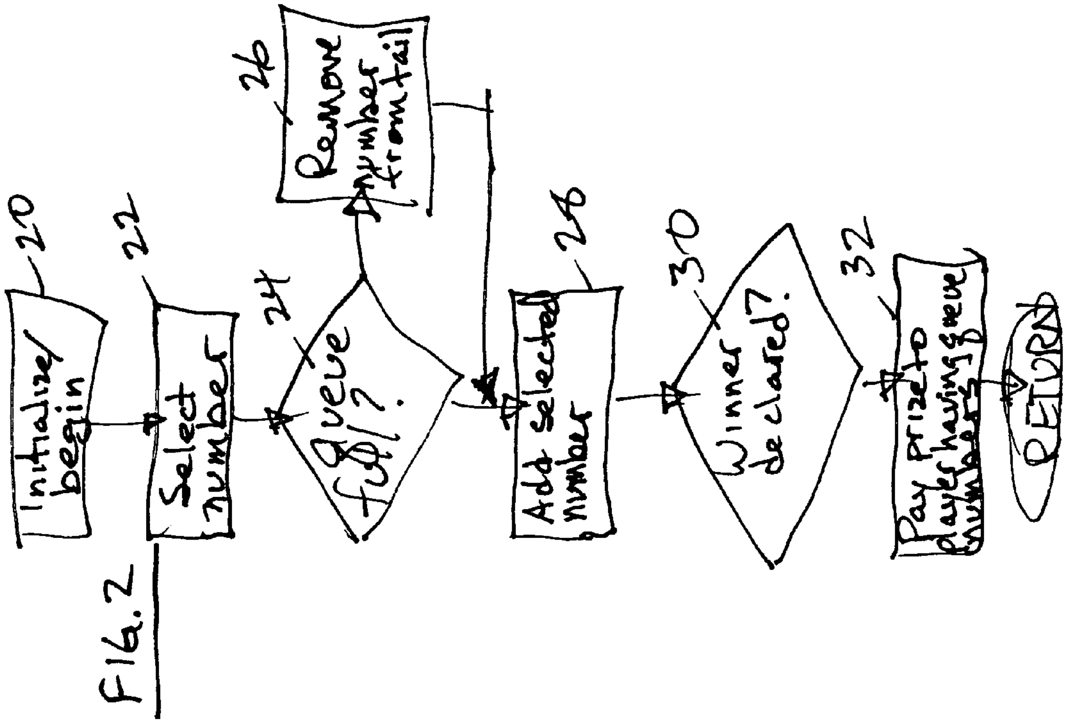
FIG. 2 illustrates a sequence of acts performed in accordance with the method of the present invention.

FIG. 2 illustrates acts executed in accordance with the method of the present invention. At act 20, the game is initialized and begun. At act 22, a ball is selected from the hopper, and its number is placed at the tail of a queue of most-recently-called numbers. Whenever a number is selected such as in act 22, the selected number is recorded in a data storage location or memory in an ordered structure referred to herein as a queue, but can be any other storage representation of an ordered list. The list is reordered upon every number selection to contain an ordered list of the last sequence of numbers selected, which can be a user-configured number "n," such that when the game ends the ordered list or queue contains the last n numbers called in the game. Decision act 24 makes this determination by reading the queue or other data structure representing the ordered list and removing the value at what is known as the head of the ordered list (act 26). However, many other methods of maintaining the ordered list can be implemented in various embodiments of the present invention. The numbers in the ordered list/queue are associated with the indicia appearing on the bingo cards. At decision act 26, a determination is made as to whether anyone has won the bingo game. If no, then control proceeds to decision act 28. At decision act 28, another number is selected and its value is added to the tail of the ordered list and the queue adjusted in accordance with act 22. At decision act 30, a determination is made that a winner of the game has been declared. If no, then control returns to act 22. If a winner is declared, then the prize is awarded to the game winner at act 32. Players win if they possess cards bearing sufficient matchings of the indicia in the queue to spaces on the bingo card bearing indicia. In an embodiment, cards having spaces matching only a portion of the indicia in the queue are winning cards.

In an embodiment, the present invention displays the selected numbers in a queue so that players can see which numbers could potentially be paying numbers in the ending sequence. The queue can be maintained and displayed to players at any time after the beginning of the normal bingo game, even though winning numbers will not occupy the queue until the game ends. The queue can be implemented in a variety of ways. In one embodiment, special daubers can be displayed for each number in the queue and de-activated for numbers once they are removed from the queue as another numbers enter the queue.

Figure 3:
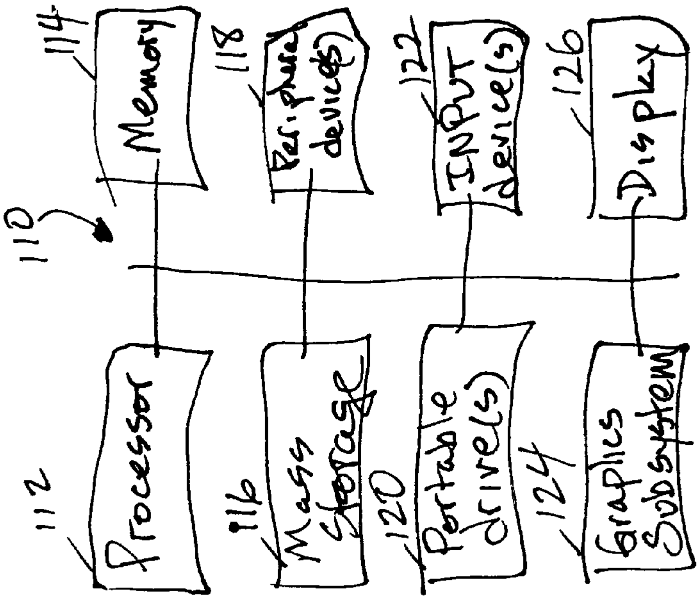
FIG. 3 is a block diagram of an apparatus implemented in components used in an embodiment of an electronic version of the enhanced game of bingo according to the present invention.

FIG. 3 illustrates the various components included in a computer system 110 that may be used to implement caller 12 and communication unit 14. The computer system 110 includes a processor 112 and memory 114. Processor 112 may contain a single microprocessor, or may contain a plurality of microprocessors for configuring the computer system as a multi-processor system. Memory 114, stores, in part, instructions and data for execution by processor 112. If the embodiment of the present invention is wholly or partially implemented in software, including a computer program, memory 114 stores the executable code when in operation. Memory 114 may include banks of dynamic random access memory (DRAM) as well as high speed cache memory. The system 110 further includes a mass storage device 116, peripheral device(s) 118, portable storage medium drive(s) 120, input device(s) 122, a graphics subsystem 124 and a display 126. For simplicity, the components shown in FIG. 2 are depicted as being connected via a single bus 128. However, the components may be connected through one or more data transport means. For example, processor 112 and memory 114 may be connected via a local microprocessor bus, and the mass storage device 116, peripheral device(s) 118, portable storage medium drive(s) 120, and graphics subsystem 124 may be connected via one or more input/output (I/O) buses. Mass storage device 116, which is typically implemented with a magnetic disk drive or an optical disk drive, is a non-volatile storage device for storing data and instructions for use by processor 112. In another embodiment, mass storage device 116 stores the computer program implementing the method of automating an enhanced bingo game for purposes of loading such computer program to memory 114. Instructions for implementing the method of the present invention also may be stored in processor 112. Portable storage medium drive 120 operates in conjunction with a portable non-volatile storage medium, such as a floppy disk, or other computer readable medium, to input and output data and code to and from the computer system 110. In one embodiment, the method of the present invention for automating an enhanced bingo game is stored on such a portable medium, and is input to the computer system 110 via the portable storage medium drive 120. Peripheral device(s) 118 may include any type of computer support device, such as an input/output (I/O) interface, to add additional functionality to the computer system 110. For example, peripheral device(s) 118 may include a network interface card for interfacing computer system 110 to a network, a modem, and the like. Input device(s) 122 provide a portion of a user interface. Input device(s) 122 may include an alphanumeric keypad for inputting alphanumeric and other key information, or a pointing device, such as a mouse, a trackball, stylus or cursor direction keys. In order to display textual and graphical information, the computer system 110 includes graphics subsystem 124 and display 126. Display 126 may include a cathode ray tube (CRT) display, liquid crystal display (LCD), other suitable display devices, or means for displaying system information. Graphics subsystem 124 receives textual and graphical information and processes the information for output to display 126. Additionally, the computer system 110 includes output devices 128. Examples of suitable output devices include speakers, printers, and the like. To connect the computer system 110 to a communication network, communications device 130 controls the flow of data between the computer system 110 and a communication network via communication line 132. The components illustrated in the computer system 110 are those typically found in general purpose computer systems, and are intended to represent a broad category of such computer components that are well known in the art. The computer system of FIG. 3 illustrates one platform that may be used for practically implementing embodiments of the present invention. Numerous other platforms can also suffice, such as Macintosh-based platforms available from Apple Computer, Inc., platforms with different bus configurations, networked platforms, multiprocessor platforms, other personal computers, workstations, mainframes, navigation systems, and the like. Alternative embodiments of the use of the method of the present invention in conjunction with the computer system 110 further include using other display means for the monitor, such as CRT display, LCD display, projection displays, or the like. Likewise, any similar type of memory, other than memory 114, may be used. Other interface apparatus, in addition to the component interfaces, may also be used including alphanumeric keypads, other key information or any pointing devices such as a mouse, trackball, stylus, cursor or direction key.

Figure 4:
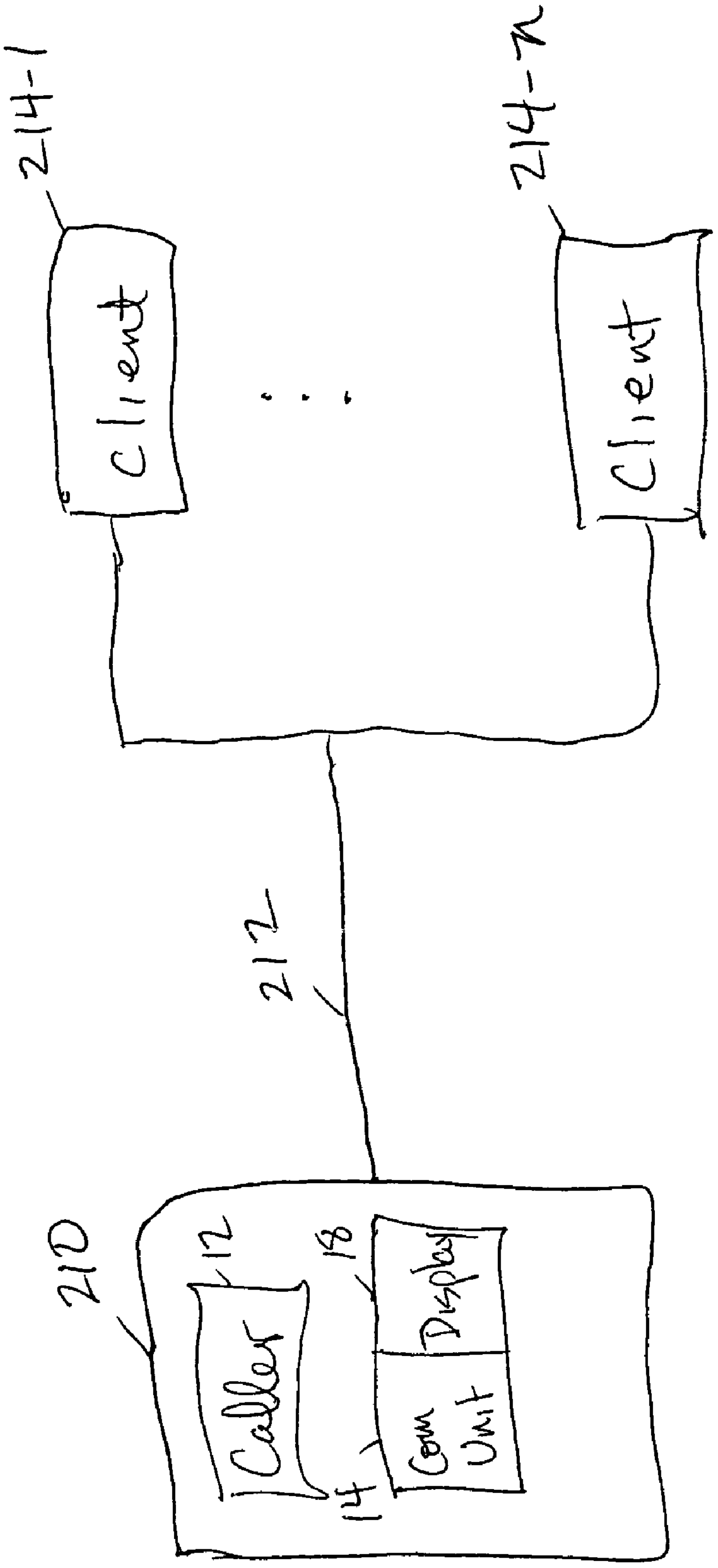
FIG. 4 is a block diagram of an embodiment of the present invention utilizing a computer network.

While the present invention has been described above in terms of an electronic embodiment where players use card minding devices to connect to a caller, and bingo halls are linked via telephone lines, the present invention can also be implemented in a client-server computer architecture illustrated in FIG. 4, wherein players connect to a gaming enterprise that operates caller 12 on server 210 and communicates to players over communication network 212, which may be a global computer network such as the Internet. Players maintain electronic bingo cards and communicate with caller 12 on clients 214-1 through **214-*n*. In this embodiment, computer system 110 may again be used to implement server 210 and clients 214**.

In another embodiment, the present invention is not implemented on a computer system, but the cards are embodied as paper cards as used in conventional bingo games, and numbers are drawn in sequence in traditional forms, such as a hopper full of numbered balls.

While the invention has been illustrated with respect to several embodiments thereof, these embodiments are to be considered illustrative rather than limiting. Various modifications and additions can be made and will be apparent to those skilled in the art. Accordingly, the invention should not be limited by the foregoing description, but rather should be defined by the following claims.

What is claimed is:

1. A method comprising:

providing one or more cards to one or more players, the card including a plurality of spaces, each space in the plurality of spaces bearing at least one indicator falling within a plurality of indicia;

selecting a number of indicators from the plurality of indicia, wherein the number of indicators from the plurality of indicia are selected consecutively for a first game, assigning the selected indicators to a first prize for the first game;

storing “n” number of most-recently selected indicators from among the selected indicators in an ordered list within a queue, such that the ordered list contains the last “n” most-recently selected indicators from among the selected indicators and further wherein there are more selected indicators than “n” most recently selected indicators;

selecting a latest indicator from the plurality of indicia consecutively following the selection of the selected indicators and storing the latest indicator in the queue of most-recently selected indicators as the latest selected indicator in the queue, and further removing an earliest consecutively selected indicator in the queue, wherein the queue is an ordered data structure within a data storage device accessible by a data processing system;

reordering the indicators in the queue upon each subsequent selection of an indicator from the plurality of indicia by placing the latest selected indicator at the tail-end of the queue and deleting the indicator at the head-end of the queue, wherein the indicator at the head-end of the queue is the earliest selected indicator from among the plurality of indicia stored in the queue;

assigning a second prize to the indicators in the queue;

awarding the first prize to the one or more players if, at the end of the first game, the card has indicators matching all of the selected indicators; and awarding the second prize to one or more players for the first game if, at the end of the first game, the card has indicators matching the indicators in the queue.

2. The method of claim 1, wherein the plurality of indicia comprises different types of indicators.

3. The method of claim 2, wherein indicia in the plurality appear on cards with different frequencies of occurrence.

4. The method of claim 3, wherein a progressive prize is associated with a card bearing indicia appearing on spaces having the indicator.

5. The method of claim 3, wherein daubers are placed on spaces appearing on the card bearing both the selected indicator drawn and a secondary indicator, the dauber remaining on a displayed queue until a desired quantity of indicia is called, the dauber removed from the space if an indicator is called after the desired quantity of indicia is called.

6. The method of claim 1, further comprising:

selecting a number of new indicators from the plurality of indicia, wherein the number of new indicators from the plurality of indicia are selected consecutively for a second game;

assigning the selected new indicators to a third prize;

storing “n” number of most-recently selected new indicators from among the selected new indicators in an ordered list within the queue, such that the ordered list contains the last “n” most-recently selected new indicators from among the selected new indicators and further wherein there are more selected new indicators than "n" most recently selected new indicators;

selecting a latest new indicator from the plurality of indicia consecutively following the selection of the selected new indicators and storing the latest new indicator in the queue of most-recently selected new indicators as the latest selected new indicator in the queue, and further removing an earliest consecutively selected new indicator in the queue;

assigning a fourth prize to the new indicators in the queue;

awarding the third prize to the player if, at the end of the second game, the card has indicators matching all of the selected new indicators; and awarding the fourth prize to the player if, at the end of the second game, the card has indicators matching the new indicators in the queue.

* * * * *